(12) United States Patent
Kostadinov et al.

(10) Patent No.: US 11,456,909 B2
(45) Date of Patent: Sep. 27, 2022

(54) JOINT LINEAR DELAY AND PHASE COMPENSATION FOR MULTIPLE ANTENNA BRANCHES

(71) Applicant: Telefonaktiebolaget LM Ericsson (publ), Stockholm (SE)

(72) Inventors: Georgi Kostadinov, Ottawa (CA); Lei Wang, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/431,289

(22) PCT Filed: Apr. 18, 2019

(86) PCT No.: PCT/IB2019/053240
§ 371 (c)(1),
(2) Date: Aug. 16, 2021

(87) PCT Pub. No.: WO2020/212740
PCT Pub. Date: Oct. 22, 2020

(65) Prior Publication Data
US 2022/0123984 A1 Apr. 21, 2022

(51) Int. Cl.
*H04L 27/26* (2006.01)
(52) U.S. Cl.
CPC ...... *H04L 27/2657* (2013.01); *H04L 27/2605* (2013.01)
(58) Field of Classification Search
CPC ............. H04L 27/2657; H04L 27/2605; H04L 27/2672; H04B 7/0413
See application file for complete search history.

(56) References Cited

U.S. PATENT DOCUMENTS

| | | | |
|---|---|---|---|
| 5,875,208 A | 2/1999 | Hoole | |
| 6,487,235 B2 | 11/2002 | Hoole | |
| 7,460,561 B2 | 12/2008 | Hoole | |
| 8,111,646 B1 | 2/2012 | Chang | |
| 2001/0033547 A1* | 10/2001 | Izumi | H04L 27/2626 370/208 |

FOREIGN PATENT DOCUMENTS

JP 2010243237 A 10/2010
WO 2010/033345 A2 3/2010

OTHER PUBLICATIONS

International Search Report and Written Opinion dated Nov. 2, 2019 issued in PCT Application No. PCT/IB2019/053240, consisting of 13 pages.

(Continued)

*Primary Examiner* — Rahel Guarino
(74) *Attorney, Agent, or Firm* — Christopher & Weisberg, P.A.

(57) ABSTRACT

A method, network node and system for providing joint phase and delay compensation for a plurality of antenna branches in a network node having a plurality of antennas by processing injected signals and feedback signals in a frequency domain are provided. According to one aspect, a method includes performing at least squares algorithm applied to the injected signals and the feedback signals to generate corrective signals applied to input signals of each antenna branch.

23 Claims, 9 Drawing Sheets

(56) References Cited

OTHER PUBLICATIONS

Gayathri Kongara, "Space-Frequency Decision Feedback Equalizer", IEEE Transactions on Vehicular Technology, vol. 60, No. 4, May 4, 2011, pp. 1626-1639, consisting of 14 pages.

Markus Nentwig, "Delay Estimation by FTT", [https://www.dsprelated.com/showarticle/26.php]; Sep. 22, 2007, consisting of 15 pages.

Satoshi Suyama, "Advanced Signal Processing for OFDM Wireless Communication Systems", Department of Communications and Integrated Systems, Graduate School of Science and Engineering, Tokyo Institute of Technology, Copyright 2010, consisting of 176 pages.

Indian Office Action dated Jun. 24, 2022 issued in corresponding Indian Application No. 202147052228, consisting of 5 pages.

\* cited by examiner

JOINT LINEAR DELAY AND PHASE COMPENSATION FOR MULTIPLE ANTENNA BRANCHES

CROSS-REFERENCE TO RELATED APPLICATIONS

This application is a Submission Under 35 U.S.C. § 371 for U.S. National Stage Patent Application of International Application Number: PCT/IB2019/053240, filed Apr. 18, 2019 entitled "JOINT LINEAR DELAY AND PHASE COMPENSATION FOR MULTIPLE ANTENNA BRANCHES," the entirety of which is incorporated herein by reference.

FIELD

The present disclosure relates to wireless communications, and in particular, to joint linear delay and phase compensation for multiple antenna branches.

BACKGROUND

Delay and phase compensation across multiple antenna branches is useful for multiple antenna radio systems where stringent requirements are imposed to allow proper functioning of multiple input multiple output (MIMO), beamforming and related technologies.

The delay and phase compensation for multiple antenna branch radio systems is usually estimated and compensated separately. For delay estimation and compensation, the widely used approach is based on the time domain correlation property of a set of known orthogonal sequences which are used as the reference signals. The reference signals are separately injected into each baseband antenna branch at the same time, and after going through the transmit and feedback processing chain, a combined sequence which has all the antenna branch specific delay and phase information is stored in a memory. To increase the accuracy of the delay estimation, the sequence in the memory is usually up-sampled. After that, the amplitude cross-correlation between the received up-sampled sequence and each of the reference sequences is performed to get the delay information for each antenna branch.

Some frequency domain based approaches to the problem of achieving delay and phase compensation use a spread spectrum signal that has multiple tones carried across the signal bandwidth to estimate and compensate the delay between a remote unit and a base station. The delay information is extracted by using the slope of the linearly regressed phase shift differences. However, in these approaches, only the delay is of interest. Phase information is not used, and the compensation is between the remote unit and a base station. Other approaches use pilot bins in an orthogonal frequency division multiplexed (OFDM) symbol to estimate the group delay by comparing a phase slope difference at each bin and averaging across the entire signal bandwidth. However, the averaging method may be suboptimal, and the compensation is also done separately at each bin in the frequency domain. Delay estimation by fast Fourier transform (FFT) uses a least squares (LS) linear regression method to extract the slope information in frequency domain as delay. However, in these approaches, the phase itself is not considered, and only the estimation of one branch is discussed.

The phase estimation and compensation are usually done in the time domain after synchronization is achieved (i.e., after delay compensation is performed). Usually, the least means squared (LMS) based approach can be applied. By switching through different antenna branches one at a time, with the synchronization performed based on the pre-estimated delay information, the phase rotated received signal is compared to the reference signal, and the phase information is extracted and averaged before being compensated.

The delay estimation requires up-sampling to achieve better precision. The higher the precision wanted, the higher the up-sampling rate. The higher up-sampling rates also mean that more correlation computation is needed to extract accurate delay information.

The delay estimation requires the design of orthogonal sequences that have both good self-correlation and good cross-correlation properties. Usually, to achieve better correlation performance, a good signal to interference plus noise ratio (SINR) is required, and thus, higher signal power is usually desirable. However, for some orthogonal sequences, this can degrade the cross-correlation performance, though the issue can be mitigated by using a longer sequence length.

Phase estimation and compensation is important in multiple antenna branch radio devices for MIMO related applications, known methods do not address the phase estimation factor, and the estimation and compensation across multiple antenna branches are also not addressed.

SUMMARY

Some embodiments advantageously provide methods and network nodes for joint linear delay and phase compensation for multiple antenna branches. According to one aspect, a set of reference sequences may be designed to be a set of orthogonal frequency domain multiplexed (OFDM) symbols with a long cyclic prefix (CP) occupying different frequency bins across the carrier bandwidth. These reference sequences do not need to be orthogonal in the time domain. They are injected into separate antenna branches at the same time in the digital baseband. The injected sequences are converted to a radio frequency (RF) analog signal and combined before being sent to the feedback path, where the combined signal is changed back to the digital baseband domain as the received signal. The received signal may then be converted to the frequency domain with a fast Fourier transform (FFT) and all bins that are assigned to the same antenna branch may be extracted. The bins that belong to the same antenna branch may be compared to the reference bins and the least squares (LS) based linear regression method may be applied to compute the desired compensation parameters (delay and phase rotation factor) at the same time. The parameters for each branch may be applied directly to the compensation module in the time domain at the corresponding antenna branch. After all the compensation parameters are applied, all antenna branches seen from the injection point towards an RF port may have the same delay and phase.

Some embodiments may have at least one or more of the following advantages:
  No time domain up-sampling and no cross-correlation operations are needed, as the estimation is indirectly done in the frequency domain with the LS based method, saving computation time and hardware resources.
  The design of the reference sequences is straightforward as there is no need for time domain orthogonality.

The power characteristics of the reference sequences can be adjusted to achieve the high precision compensation of the delay and phase of the antenna branch.

The delay and the phase parameters are computed at the same time, and by using an indirect learning structure, the parameters can be directly applied to the compensation module in the corresponding antenna branch.

According to one aspect, a method of compensating for phase and delay introduced by each of a plurality of transmitter circuits is provided. The method includes generating N signals $x_p$ from N frequency domain signals $X_p$, each frequency domain signal $X_p$ being an $N_f$ point Fourier transform of a corresponding signal $x_p$, each frequency domain signal $X_p$ having components being assigned to $M_p$ different frequency bins, $M_p$ being an integer greater than 2, each signal $x_p$ having an orthogonal frequency division multiplex, OFDM, symbol and cyclic prefix, CP. The method further includes injecting each signal $x_p$ into a different one of N parallel feed forward paths, each parallel feed forward path having a phase/delay compensation circuit and a transmitter circuit, each phase/delay compensation circuit configured to introduce a different amount of first phase $\widetilde{\theta_p}$ and first delay $\widetilde{D_p}$ to a respective signal $x_p$ to produce a signal $z_p$, each transmitter circuit introducing a different amount of unknown phase $\theta_p$ and unknown delay $D_p$ to a respective signal $z_p$, so that each transmitter circuit outputs a different output signal $y_p$. The method further includes applying an $N_f$ point Fourier transform to a sum of the output signals $y_p$. The method also includes splitting the Fourier transformed sum to produce N signals $Y_p$. The method further includes inputting each signal $Y_p$ to a different one of N parallel feedback paths, each parallel feedback path having a phase/delay compensation replica circuit corresponding to a phase/delay compensation circuit and configured to introduce a corresponding first phase $\widetilde{\theta_p}$ and first delay $\widetilde{D_p}$ to a respective signal $Y_p$ to produce a signal $Y_p'$. The method also includes applying an $N_f$ point Fourier transform to each signal $z_p$ to produce a signal $Z_p$ and inputting each of the N signals $Y_p'$ and a corresponding one of the N signals $Z_p$ to a least squared process to produce N corrective signals $v_p$. The method also includes adjusting each phase/delay compensation circuit by a respective one of the N corrective signals $v_p$ to compensate for the unknown phase $\theta_p$ and unknown delay $D_p$ introduced by each transmitter circuit of the plurality of parallel transmitter circuits in the plurality of feed forward parallel paths.

According to this aspect, in some embodiments, at least one of the phase/delay compensation circuits includes a configurable multi-tap delay line, a configurable N-tap filter and a phase compensator. In some embodiments, the number $N_f$ is selected based on at least one of a signal sample rate, a signal bandwidth or the number N of feed forward paths. In some embodiments, a length of the CP is selected based on at least one of an anticipated delay of a transmitter circuit in the plurality of transmitter circuits or a difference in delay between the feed forward paths. In some embodiments, a maximum length of the CP is $N_f-1$. In some embodiments, the number M of frequency bins is proportional to the number N of feed forward paths. In some embodiments, the number M of frequency bins is equal to the number N of feed forward paths times the number $N_f$ of points of X.

According to another aspect, a phase and delay compensation system configured to compensate for phase and delay introduced by each of a plurality of transmitter circuits in a network node or wireless device is provided. The system includes processing circuitry configured to generate N signals $x_p$ from N frequency domain signals $X_p$, each frequency domain signal $X_p$ being an $N_f$ point Fourier transform of a corresponding signal $x_p$, each frequency domain signal $X_p$ having components being assigned to $M_p$ different frequency bins, $M_p$ being an integer greater than 2, each signal $x_p$ having an orthogonal frequency division multiplex, OFDM, symbol and cyclic prefix, CP. The processing circuitry is also configured to inject each signal $x_p$ into a different one of N parallel feed forward paths, each parallel feed forward path having a phase/delay compensation circuit and a transmitter circuit, each phase/delay compensation circuit configured to introduce a different amount of first phase $\widetilde{\theta_p}$ and first delay $\widetilde{D_p}$ to a respective signal $x_p$ to produce a signal $z_p$, each transmitter circuit introducing a different amount of unknown phase $\theta_p$ and unknown delay $D_p$ to a respective signal $z_p$, so that each transmitter circuit outputs a different output signal $y_p$. The processing circuitry is further configured to apply an $N_f$ point Fourier transform to a sum of the output signals $y_p$ and split the Fourier transformed sum to produce N signals $Y_p$. The processing circuitry is also configured to input each signal $Y_p$ to a different one of N parallel feedback paths, each parallel feedback path having a phase/delay compensation replica circuit corresponding to a phase/delay compensation circuit and configured to introduce a corresponding first phase $\widetilde{\theta_p}$ and first delay $\widetilde{D_p}$ to a respective signal $Y_p$ to produce a signal $Y_p'$. The processing circuitry is further configured to apply an $N_f$ point Fourier transform to each signal $z_p$ to produce a signal $Z_p$, and input each of the N signals $Y_p'$ and a corresponding one of the N signals $Z_p$ to a least squared process to produce N corrective signals $v_p$. The processing circuitry is also configured to adjust each phase/delay compensation circuit by a respective one of the N corrective signals $v_p$ to compensate for the unknown phase $\theta_p$ and unknown delay $D_p$ introduced by each transmitter circuit of the plurality of parallel transmitter circuits in the plurality of feed forward paths.

According to this aspect, in some embodiments, at least one of the phase/delay compensation circuits include a configurable multi-tap delay line, a configurable N-tap filter and a phase compensator. In some embodiments, the number $N_f$ is selected based on at least one of a signal sample rate, a signal bandwidth or the number N of feed forward paths. In some embodiments, a length of the CP is selected based on at least one of an anticipated delay of a transmitter circuit of the plurality of transmitter circuits or a difference in delay between the feed forward paths. In some embodiments, a maximum length of the CP is $N_f-1$. In some embodiments, the number M of frequency bins is proportional to the number N of feed forward paths. In some embodiments, the number M of frequency bins is equal to the number N of feed forward paths times the number $N_f$ of points of X.

According to yet another aspect, a phase and delay compensation system implemented in a network node configured to compensate for phase and delay introduced by each of a plurality of parallel transmitter circuits is provided. The system includes processing circuitry configured to inject N signals, x, into N circuit paths that each include a phase/delay compensation module and a transmitter circuit, each signal x having an orthogonal frequency division multiplex, OFDM, symbol and cyclic prefix, CP, x being generated by an $N_f$ point inverse Fourier transform on a frequency domain signal, X, each frequency domain signal X having components being assigned to M different frequency bins, M being an integer greater than 2. The processing circuitry is further configured to introduce to each of the N signals x a first phase and a first delay via a phase/delay compensation module to produce from each of the N circuit paths an output signal z. The processing circuitry is also configured to input each of the N signals z to a different transmitter circuit, which introduces to the signal z an unknown phase and an unknown delay to produce one of N outputs y. The processing circuitry is further configured to sum by an adder the N outputs y to form a sum signal and perform an $N_f$ point Fourier transform, via an FFT, on the output y to produce a Fourier transformed output signal. The processing circuitry is further configured to split the Fourier transformed output signal, via a splitter, into N parallel signals Y, each signal Y having components from different ones of the M frequency bins, and introduce to each of the N signals Y the first phase and first delay in a phase/delay compensation replica module to produce N corresponding signals Y'. The processing circuitry is further configured to perform an $N_f$ point Fourier transform, via an FFT, on each signal z to produce a plurality of N parallel signals Z and input each of the N signals Y' and a corresponding one of the N signals Z to a least squared process to produce N corrective signals v. The processing circuitry is further configured to adjust each phase/delay compensation module by a respective one of the N corrective signals v to compensate for the unknown phase and unknown delay introduced by each transmitter circuit in the plurality of parallel transmitter circuits.

According to this aspect, in some embodiments, at least one of the phase/delay compensation modules includes a configurable multi-tap delay line, a configurable N-tap filter and a phase compensator. In some embodiments, the number $N_f$ is selected based on at least one of a signal sample rate, a signal bandwidth or the number N of circuit paths. In some embodiments, a length of the CP is selected based on at least one of an anticipated delay of a transmitter circuit or a difference in delay between the circuit paths. In some embodiments, a maximum length of the CP is $N_f-1$. In some embodiments, the number M of frequency bins is proportional to the number N of circuit paths.

According to another aspect, a method of compensating for phase and delay introduced by each of a plurality of transmitter circuits is provided. The method includes generating a plurality of test signals x, each test signal x having frequency components distributed over a plurality of frequency bins. The method further includes injecting each of the plurality of test signals x into a different one of a plurality of branches, each branch having a phase/delay compensation circuit and a transmitter circuit, each phase/delay compensation circuit having a first phase and first delay applied to a test signal x to produce a signal z and the transmitter circuit configured to receive the signal z and having an unknown phase and unknown delay applied to the signal z to produce an output signal y. The method further includes converting the output signals y from the plurality of branches to a frequency domain, via the FFT, to produce a first set of frequency domain signals Y, each frequency domain signal Y having frequency components distributed over the plurality of frequency bins. The method also includes converting, via the FFTs, the signals z to the frequency domain to produce a second set of frequency domain signals Z, each frequency domain signal Z corresponding to a frequency domain signal Y. The method further includes applying the first phase and first delay to each signal Y via a phase/delay compensation replica circuits to produce a signal Y'. The method also includes comparing, via the LS circuits each signal Y' to a corresponding signal Z to produce a corrective signal v, and applying the corrective signal v to a corresponding phase/delay compensation circuit in a branch to compensate for the unknown phase and unknown delay of a corresponding transmitter circuit in the branch.

According to this aspect, in some embodiments, the comparing is by a least squares algorithm. In some embodiments, each test signal x has an orthogonal frequency division multiplex, OFDM, symbol and cyclic prefix, CP, x being generated by an $N_f$ point inverse Fourier transform on a frequency domain signal, X, each frequency domain signal X having components being assigned to M different frequency bins, M being an integer greater than 2.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
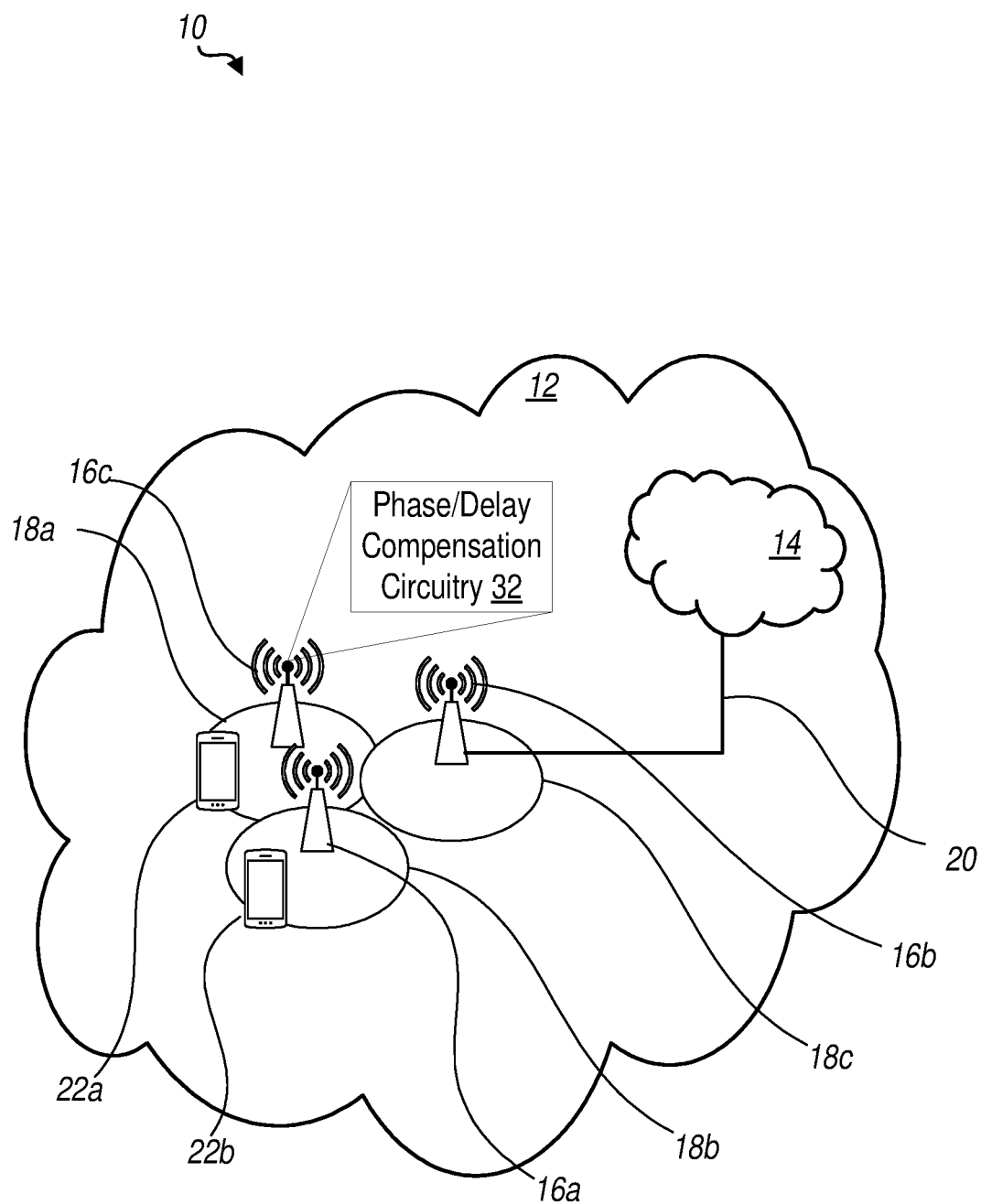
FIG. 1 is a schematic diagram of an exemplary network architecture illustrating a communication system according to the principles in the present disclosure.

Before describing in detail exemplary embodiments, it is noted that the embodiments reside primarily in combinations of apparatus components and processing steps related to a joint linear delay and phase compensation method for multiple antenna branches. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide joint phase and delay compensation for a plurality of antenna branches in a network node having a plurality of antennas by processing injected signals and feedback signals in a frequency domain. According to one aspect, a method includes performing a least squares algorithm applied to the injected signals and the feedback signals to generate corrective signals applied to input signals of each antenna branch.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include phase/delay compensation circuitry 32 which is configured to achieve a joint linear delay and phase compensation method for multiple antenna branches.

Example implementations, in accordance with an embodiment, of the WD 22, network node 16 and host computer 24 discussed in the preceding paragraphs will now be described with reference to FIG. 2.

The communication system 10 includes a network node 16 provided in a communication system 10 and including hardware 38 enabling it to communicate with the WD 22. The hardware 38 may include a radio interface 42 for setting up and maintaining at least a wireless connection 46 with a WD 22 located in a coverage area 18 served by the network node 16. The radio interface 42 may be formed as or may include, for example, one or more RF transmitters, one or more RF receivers, and/or one or more RF transceivers. In some embodiments, the hardware 38 is configured to implement a phase and delay compensation system.

In the embodiment shown, the hardware 38 of the network node 16 that is configured to implement the phase and delay compensation system further includes processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 52, or stored in external memory (e.g., database, storage array, network storage device, etc.) accessible by the network node 16 via an external connection. The software 44 may be executable by the processing circuitry 48. The processing circuitry 48 may be configured to control any of the methods and/or processes described herein and/or to cause such methods, and/or processes to be performed, e.g., by network node 16. Processor 50 corresponds to one or more processors 50 for performing network node 16 functions described herein. The memory 52 is configured to store data, programmatic software code and/or other information described herein. In some embodiments, the software 44 may include instructions that, when executed by the processor 50 and/or processing circuitry 48, causes the processor 50 and/or processing circuitry 48 to perform the processes described herein with respect to network node 16. For example, processing circuitry 48 of the network node 16 may include phase/delay compensation circuitry 32 which is configured to achieve a joint linear delay and phase compensation method for multiple antenna branches.

The communication system 10 further includes the WD 22 already referred to. The WD 22 may have hardware 60 that may include a radio interface 62 configured to set up and maintain a wireless connection 64 with a network node 16 serving a coverage area 18 in which the WD 22 is currently located. The radio interface 62 may be formed as or may include, for example, one or more RF transmitters, one or more RF receivers, and/or one or more RF transceivers.

The hardware 60 of the WD 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 70, which is stored in, for example, memory 68 at the WD 22, or stored in external memory (e.g., database, storage array, network storage device, etc.) accessible by the WD 22. The software 70 may be executable by the processing circuitry 64. The software 70 may include a client application 72. The client application 72 may be operable to provide a service to a human or non-human user via the WD 22.

The processing circuitry 64 may be configured to control any of the methods and/or processes described herein and/or to cause such methods, and/or processes to be performed, e.g., by WD 22. The processor 66 corresponds to one or more processors 66 for performing WD 22 functions described herein. The WD 22 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 22.

Figure 2:
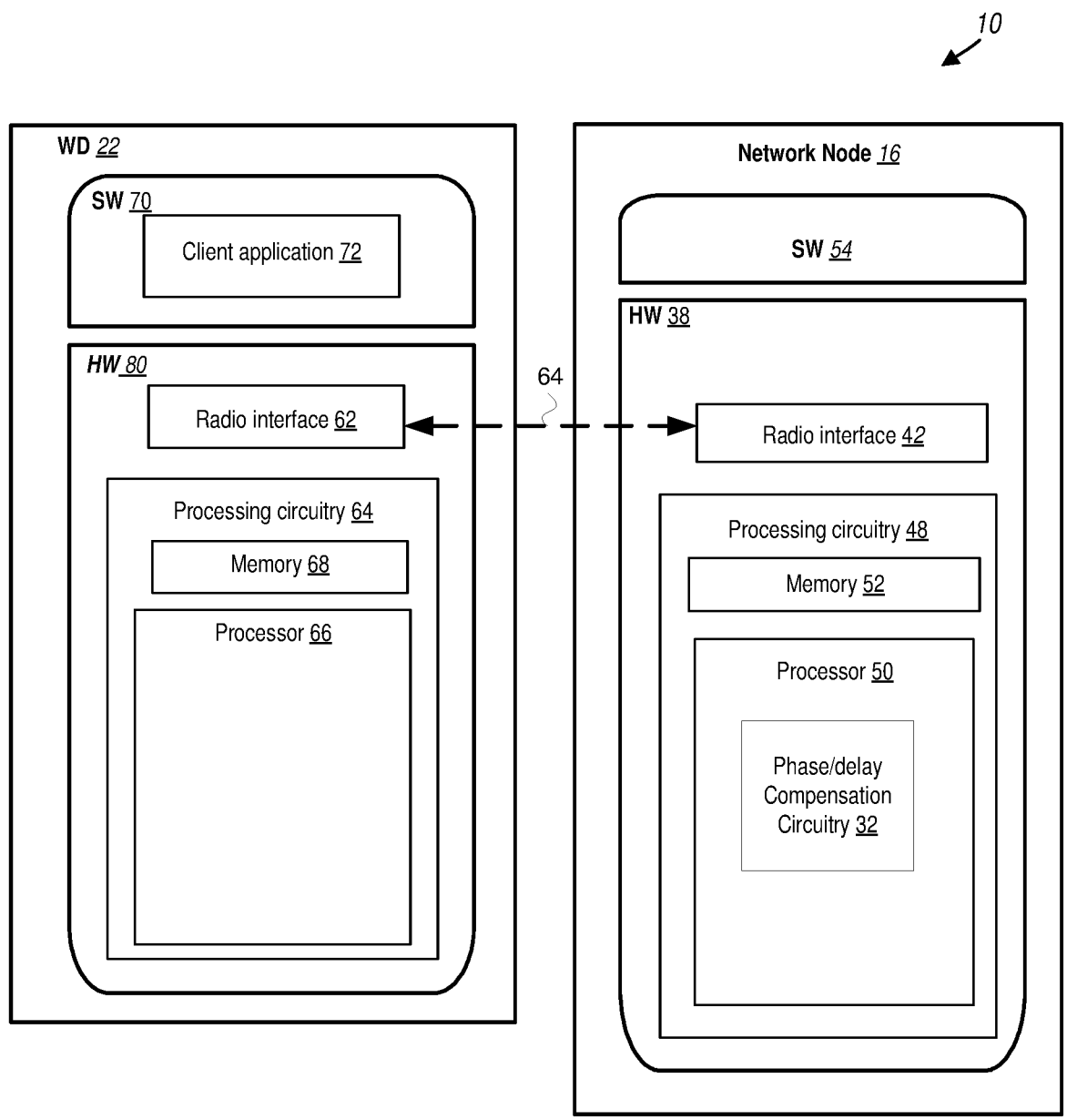
FIG. 2 is a block diagram of a network node in communication with a wireless device over a wireless connection according to some embodiments of the present disclosure.

In some embodiments, the inner workings of the network node 16 and WD 22 may be as shown in FIG. 2 and independently, the surrounding network topology may be that of FIG. 1.

The wireless connection 46 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as phase/delay compensation circuitry 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
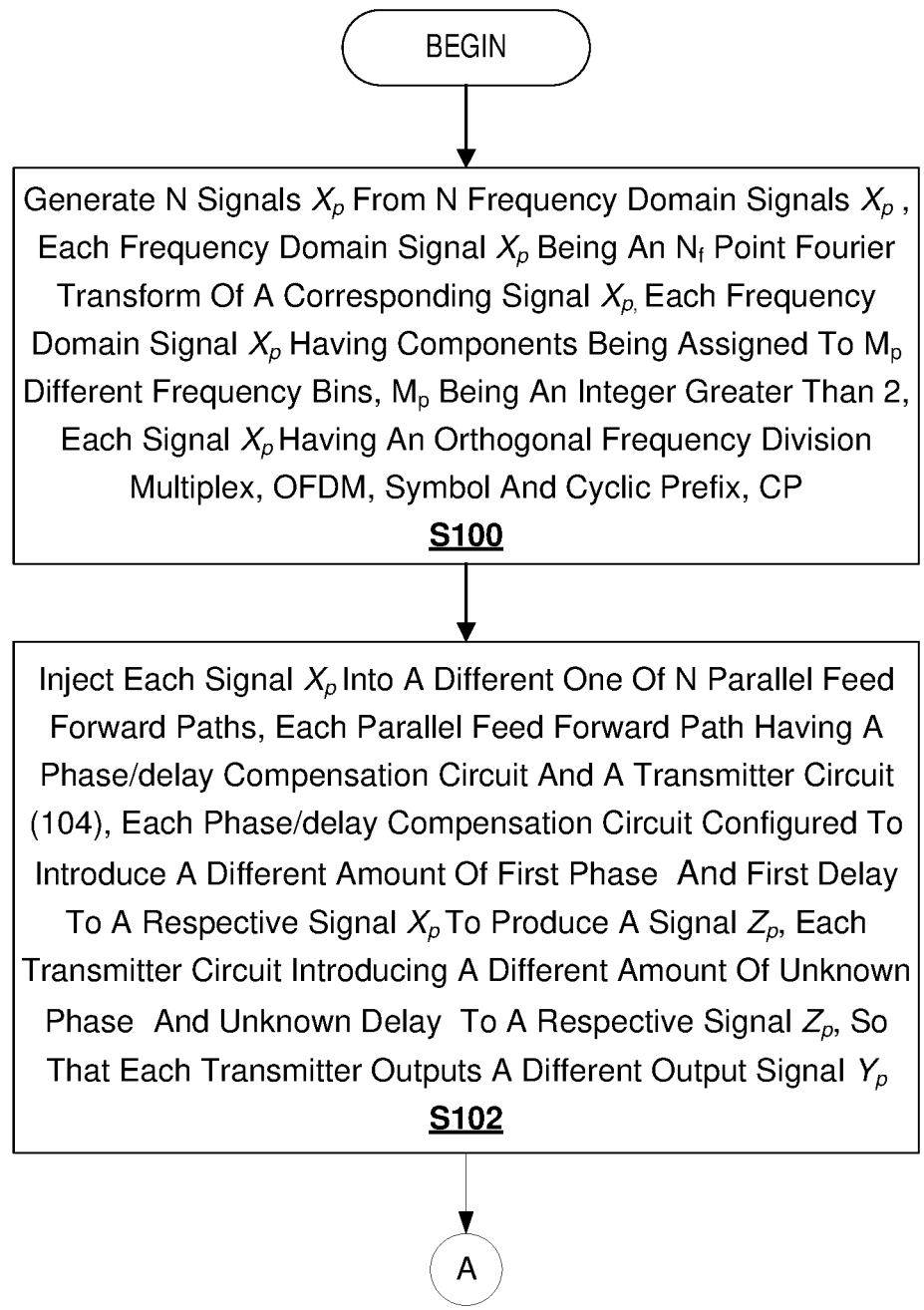
FIGS. 3 and 4 depict a flowchart of an exemplary process in a network node for phase and delay compensation for a plurality of antenna branches according to some embodiments of the present disclosure.

FIG. 3 is a flowchart of an exemplary process in a network node 16 for compensating for phase and delay introduced by each of a plurality of transmitter circuits. The process includes generating, via the signal generator unit 32, N signals $x_p$ from N frequency domain signals $X_p$, each frequency domain signal $X_p$ being an $N_f$ point Fourier transform of a corresponding signal $x_p$, each frequency domain signal $X_p$ having components being assigned to $M_p$ different frequency bins, $M_p$ being an integer greater than 2, each signal $x_p$ having an orthogonal frequency division multiplex, OFDM, symbol and cyclic prefix, CP (Block S100). The process also includes injecting each signal $x_p$ into a different one of N parallel feed forward paths, each parallel feed forward path having a phase/delay compensation circuit 102 and a transmitter circuit 104, each phase/delay compensation circuit 102 configured to introduce a different amount of first phase $\widetilde{\theta_p}$ and first delay $\widetilde{D_p}$ to a respective signal $x_p$ to produce a signal $z_p$, each transmitter circuit 104 introducing a different amount of unknown phase $\theta_p$ and unknown delay $D_p$ to a respective signal $z_p$, so that each transmitter circuit 104 outputs a different output signal $y_p$ (Block S102).

Figure 4:
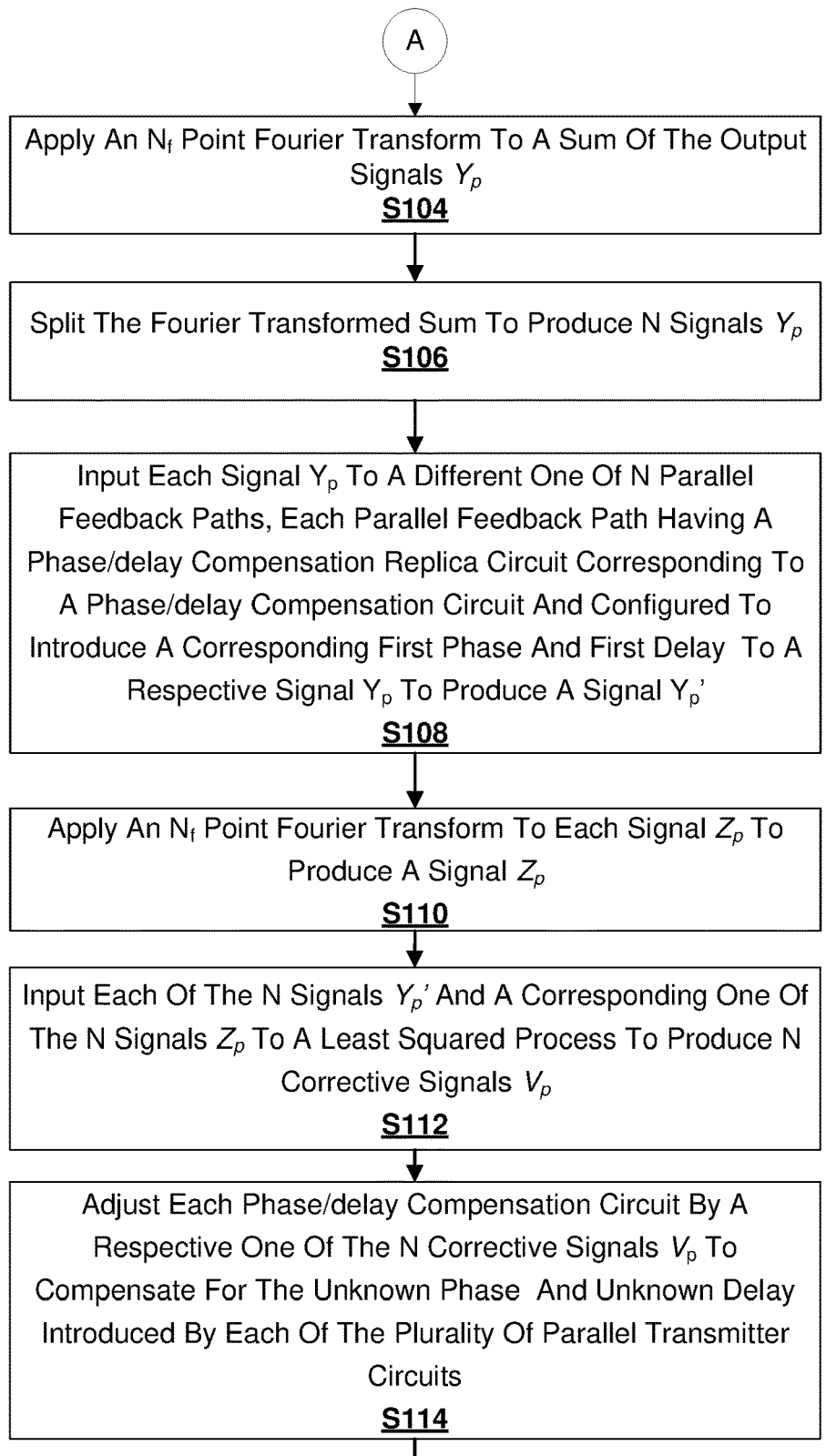

FIG. 4 is a continuation of the flowchart of FIG. 3 (the process at "A" on FIG. 3 is continued at "A" in FIG. 4). The process further includes applying an $N_f$ point Fourier transform to a sum of the output signals $y_p$ (Block S104). The process includes splitting the Fourier transformed sum to produce N signals $Y_p$ (Block S106). The process also includes inputting each signal $Y_Y$ to a different one of N parallel feedback paths, each parallel feedback path having a phase/delay compensation replica circuit 114 corresponding to a phase/delay compensation circuit 102 and configured to introduce a corresponding first phase $\widetilde{\theta_p}$ and first delay $\widetilde{D_p}$ to a respective signal $Y_p$ to produce a signal $Y_p'$ (block S108). The process further includes applying an $N_f$ point Fourier transform to each signal $z_p$ to produce a signal $Z_p$ (Block S110). The process includes inputting each of the N signals $Y_p'$ and a corresponding one of the N signals 4 to a least squared process 118 to produce N corrective signals $v_p$ (Block S112). The process further includes adjusting each phase/delay compensation circuit 102 by a respective one of the N corrective signals $v_p$ to compensate for the unknown phase $\theta_p$ and unknown delay $D_p$ introduced by each transmitter circuit 104 of the plurality of parallel transmitter circuits 104 in the plurality of feed forward parallel paths (Block S114).

Figure 5:
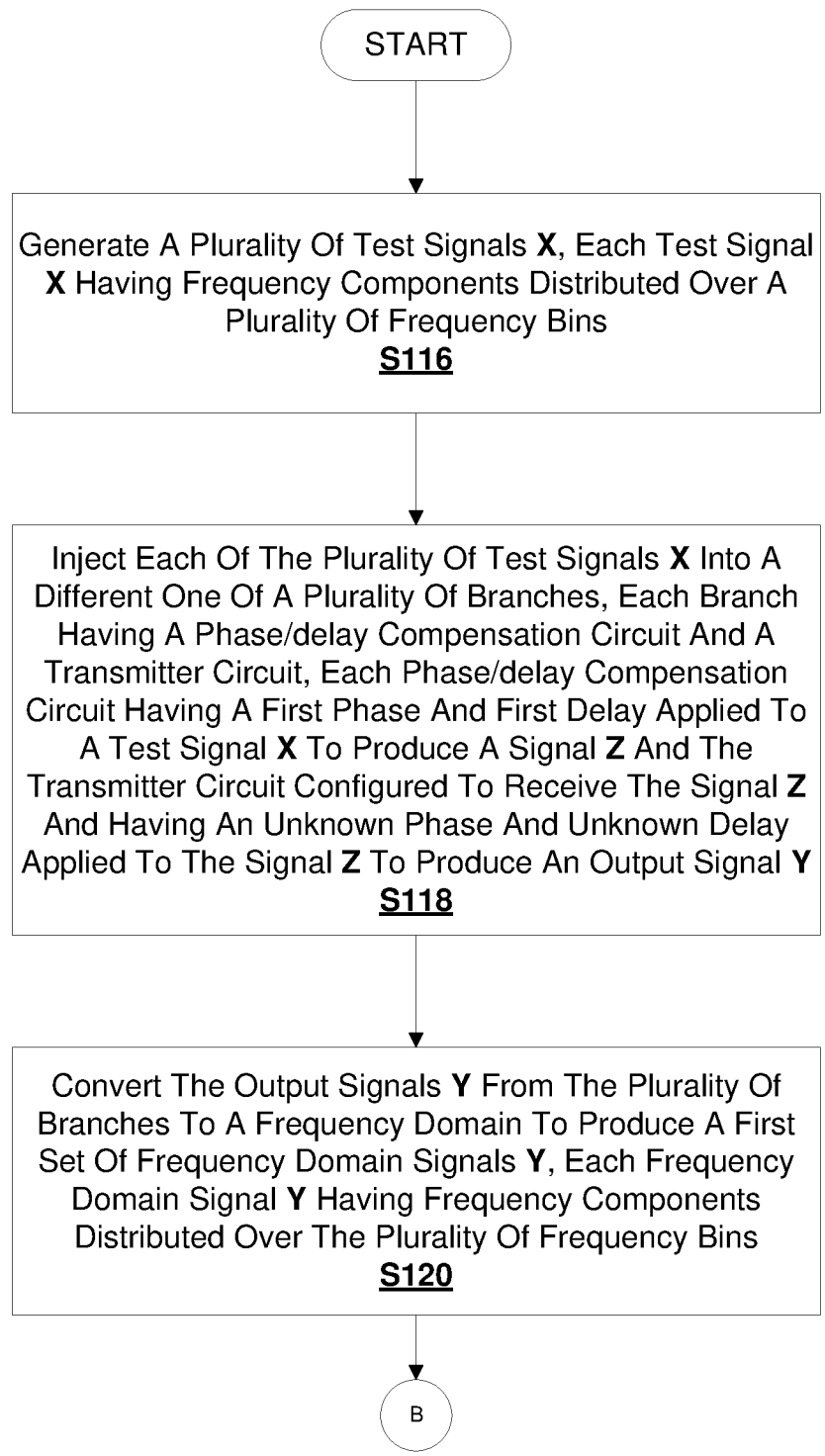
FIGS. 5 and 6 are a flowchart of another exemplary process in a network node for phase and delay compensation for a plurality of antenna branches according to some embodiments of the present disclosure.

FIG. 5 is a flowchart of another exemplary process in a network node 16 according to some embodiments of the present disclosure. The process also includes generating, via the signal generator unit 32, a plurality of test signals x, each test signal x having frequency components distributed over a plurality of frequency bins (Block S116). The process also includes injecting each of the plurality of test signals x into a different one of a plurality of branches, each branch having a phase/delay compensation circuit 102 and a transmitter circuit 104, each phase/delay compensation circuit 102 having a first phase and first delay applied to a test signal x to produce a signal z and the transmitter circuit 104 configured to receive the signal z and having an unknown phase and unknown delay applied to the signal z to produce an output signal y (Block S118). The process also includes converting, via the FFT 116, the output signals y from the plurality of branches to a frequency domain to produce a first set of frequency domain signals Y, each frequency domain signal Y having frequency components distributed over the plurality of frequency bins (S120).

Figure 6:
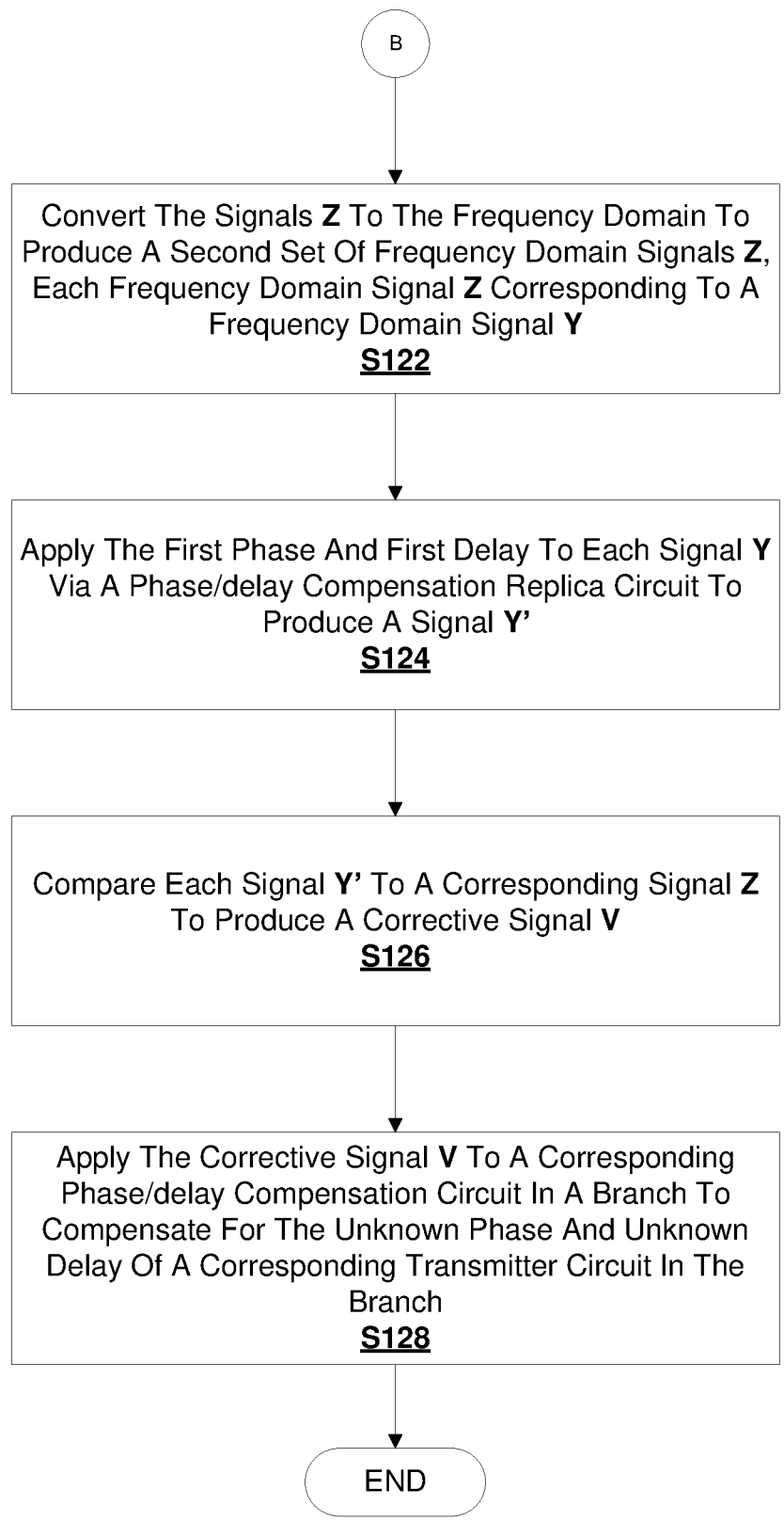

FIG. 6 is a continuation of the flowchart of FIG. 5 (the process at "A" on FIG. 5 is continued at "A" in FIG. 6). The process includes converting, via the FFTs 116, the signals z to the frequency domain to produce a second set of frequency domain signals Z, each frequency domain signal Z corresponding to a frequency domain signal Y (Block S122). The process further includes applying, the first phase and first delay to each signal Y via a phase/delay compensation replica circuit 120 to produce a signal Y' (Block S124). The process also includes comparing, via the least squares unit 78, 118, for example, each signal Y' to a corresponding signal Z to produce a corrective signal v (Block S126). The process further includes applying, via the compensation circuits 102, the corrective signal v to a corresponding phase/delay compensation circuit in a branch to compensate for the unknown phase and unknown delay of a corresponding transmitter circuit in the branch (Block S128).

Having described the general process flow of arrangements of the disclosure and having provided examples of hardware and software arrangements for implementing the processes and functions of the disclosure, the sections below provide details and examples of arrangements for a joint linear delay and phase compensation method for multiple antenna branches.

Figure 7:
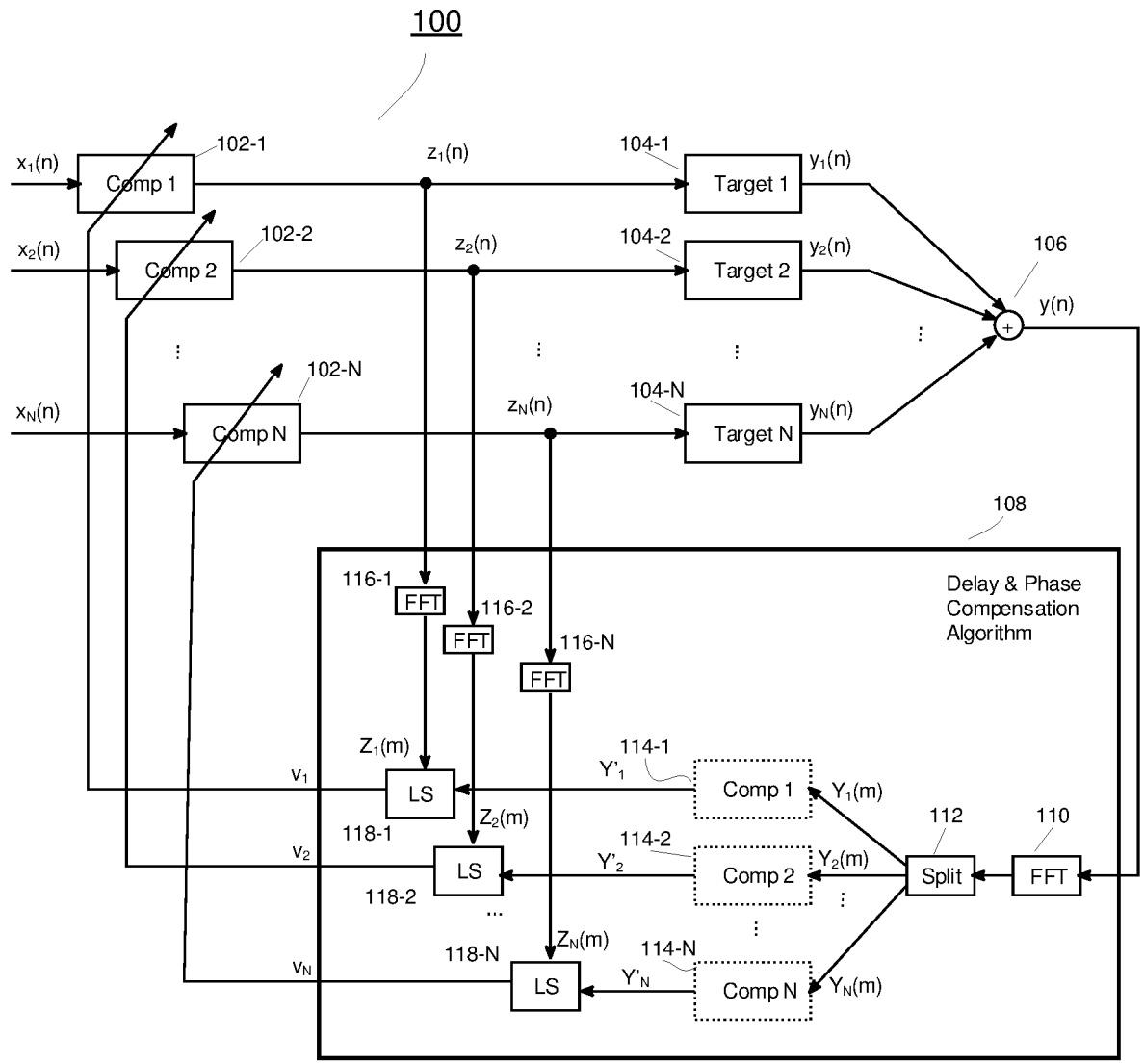
FIG. 7 is a system for compensating for phase and delay in a plurality of antenna branches.
Figure 8:
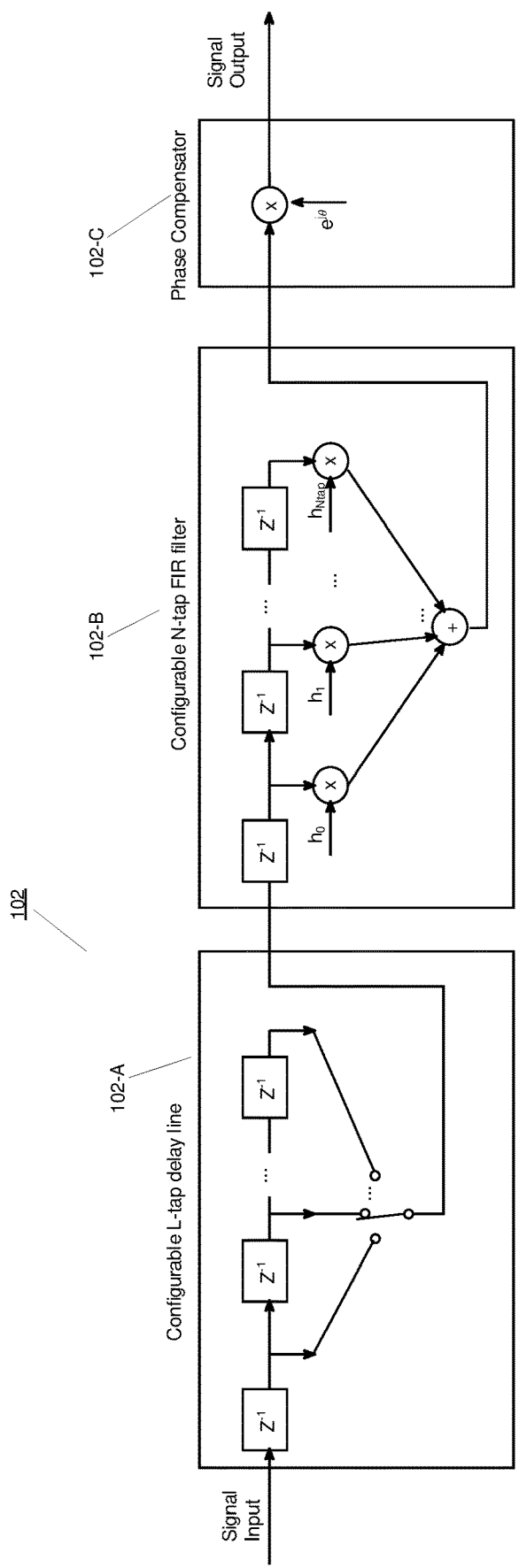
FIG. 8 is a block diagram of an example of a phase and delay compensation circuit used for phase and delay compensation in an antenna branch.

An N antenna branch delay and phase compensation structure 100 for implementing the phase/delay compensation circuitry 32 and radio interface 42, is shown in FIG. 7. A feed forward path in each antenna branch p includes a compensation module 102-$p$ (where p is 1 to N) of the branch. The compensation modules, 102-1, 102-2, . . . 102-N are referred to collectively herein as compensation modules 102. A compensation module p has a delay parameter $\widetilde{D_p}$ and phase rotation parameter $\widetilde{\theta_p}$, and transfers input signal $x_p$(n) to output signal $z_p$(n). An example implementation of the compensation module 102 is shown in FIG. 8. A configurable L step delay line 102-A introduces integer sample delay to the signal. The L step delay line 102-A is cascaded with an $N_{tap}$ tap FIR filter 102-B, which, given proper coefficients, provides the fractional sample delay to the signal. The phase compensator sub-block 102-C is used to correct for phase rotation. Each compensation module 102-$p$ outputs corresponding signal $z_p$(n).

The injected signals $x_p$(n) for p=1, 2, . . . , N are OFDM symbols with CP generated by an $N_{FFT}$ point input fast Fourier transform (IFFT) operation of a frequency domain signal $X_p$(m). Each frequency domain signal $X_p$(m) is assigned $M_p$ different frequency bins ($M_p$>2) in set $B_p$ across the entire signal bandwidth and only has non-zero frequency domain complex values at the assigned bins. FIG. 8 gives an example of a 4-branch system with 40 usable bins, where each branch p is assigned bin number 4p+1. Therefore, each branch has 10 frequency bins across the usable signal bandwidth in this example.

Referring again to FIG. 7, each compensation module 102-$p$ is located before the corresponding target module 104-$p$, which introduces an unknown delay $D_p$ and an unknown phase rotation $\theta_p$ to the signal $z_p$(n) on the branch and generates output signal $y_p$(n). The target modules, 104-1, 104-2, 104-$p$ . . . 104-N are referred to collectively herein as target modules 104. Thus, the target module 104 is abstracted from both the digital processing chain and analog processing chain of radio interface 42 after the compensation block 102, for which the accumulated signal delay and phase rotation are modeled by parameters $D_p$ and $\theta_p$ respectively. Each target module 104 has the components of a transmitter that includes an RF front end, and may include a modulator, an amplifier, a filter, and an isolator or directional coupler, for example. Both the compensation modules 102 and the target modules 104 may be modeled as linear systems. The signals $y_p$(n),p=1, 2, . . . , N are added together by adder 106 to form signal y(n). The frequency domain counter parts of signals $x_p(n)$, $z_p(n)$, $y_p(n)$ and y(n) are $X_p(m), Z_p(m)$, $Y_p(m)$ and Y(m), respectively.

The output signal y(n) is input to the delay and phase compensation algorithm module 108. The output signal y(n) is input to a fast Fourier transform module 110 which transforms the output signal y(n) to the frequency domain signal Y(m). Instead of the an FFT, a discrete Fourier transform (DFT) may be implemented. The output of the FFT module 110 is input to a splitter 112 that splits the input signal Y(m) into its respective frequency bin signals $Y_p(m)$. The signal y(n) is usually available in a real system and an $N_{FFT}$ point FFT operation on y(n) produces all the frequency bin signals $Y_p(m)$ that are occupied by different antenna branches. Given the bin assignment information $B_p$, $Y_p(m)$ can be recovered. Now that $Y_p(m)$ and $X_p(m)$ are available, the delay and phase information can be derived using an LS method described below.

The values $Y_p(m)$ are input to respective ones of the compensation replica modules 114. The compensation replica modules 114-1, 114-2, 114-p . . . 114-N, referred to collectively herein as compensation replica modules 114, are replicas of the corresponding compensation modules 102, and introduce the delay and phase parameters $\widetilde{D_p}$ and $\widetilde{\theta_p}$. To initiate the process, a target delay parameter may be set by a user to make the overall delay between signal $x_p(n)$ and $y_p(n)$ across all antenna branches to be the same value $D_{tar}$. In some embodiments, the value $D_{tar}$ may be selected so that it is larger than an anticipated unknown delay of a branch.

The outputs z(n) of the compensation modules 102 are input to respective ones of FFTs 116-1, 116-2, 116-p . . . 116-N, referred to herein collectively as FFTs 116, to produce signals Z(m). Once again, the FFTs 116 can be replaced by DFTs. The signals Z(m) and the outputs of the compensation replica modules 114 are input to respective ones of least squares modules 118-1, 118-2, 118-p . . . 118-N, referred to collectively herein as LS modules 118. The LS modules 118 implement the processes described below to produce corrective signals $v_1, v_2, v_p \ldots v_N$. The corrective signals v adjust the delay and phase signals $\widetilde{D_p}$ and $\widetilde{\theta_p}$ of the compensation modules 102. A reason for implementing the compensation modules 102 and algorithm 108 is that the unknown delay and phase of the target modules 104 can change over time and with temperature, in particular due to the analog components of the target modules. A purpose of the delay and phase compensation structure 100 is to compensate for these changes. Thus, the methods described herein may be performed intermittently or periodically.

The choice of value of $N_{FFT}$ can be based on the signal sampling rate, bandwidths, and number of branches to be compensated. Usually bigger $N_{FFT}$ offers more usable bins for each antenna branch, and the cost is bigger size of FFT operation on signal y(n). The selection of CP length $N_{CP}$ is determined by the overall anticipated delay of the unknown module and the difference of the delay between different branches. The maximum CP length is $N_{FFT}-1$. The $N_{FFT}$ and $N_{CP}$ may be selected so that the overall combined delay of both compensation block and unknown block is less than the $N_{CP}$ for all antenna branches.

The LS modules 118 may perform the following-described processes. The overall delay through the compensation modules 102 and target modules 104 is expected to be $D_{tar}$, and the overall phase is expected to be zero. For antenna branch, the output of the compensation replica module 114-p is compared to the input from the target modules 104 in the frequency domain, yielding:

$$Z_p(e^{j\Omega})e^{-jD_{tar}\Omega} = Y_p(e^{j\Omega})e^{-j(\widetilde{D_p}\Omega+\widetilde{\theta_p})}$$

The phase relationship would be:

$$(\phi_{Y_p}(\Omega))-(\phi_p(\Omega)-D_{tar}\Omega)=(\widetilde{D_p}\Omega+\widetilde{\theta_p})$$

where $\phi_{Y_p}(\Omega)$ and $\phi_{Z_p}(\Omega)$ are phase of $Y_p(e^{j\Omega})$ and $Z_p(e^{j\Omega})$ respectively. For all the frequency bins in $B_p$, the phase relationship can be written as $$A_p v_p = c_p$$

where $A_p$ is the matrix:

$$A_p = \begin{bmatrix} \Omega_p(1) & 1 \\ \Omega_p(2) & 1 \\ \ldots & \ldots \\ \Omega_p(M_p) & 1 \end{bmatrix}$$

and $c_p$ is the column vector $$c_p=[\phi_p(1), \phi_p(2), \ldots \phi_p(M_p)]^T$$

with a properly unwrapped phase $$\phi_p(i)=\phi_{Y_p}(\Omega_p(i))-\phi_{Z_p}(\Omega_p(i))+D_{tar}\Omega_p(i),=1,2,\ldots,M_p$$

Figure 9:
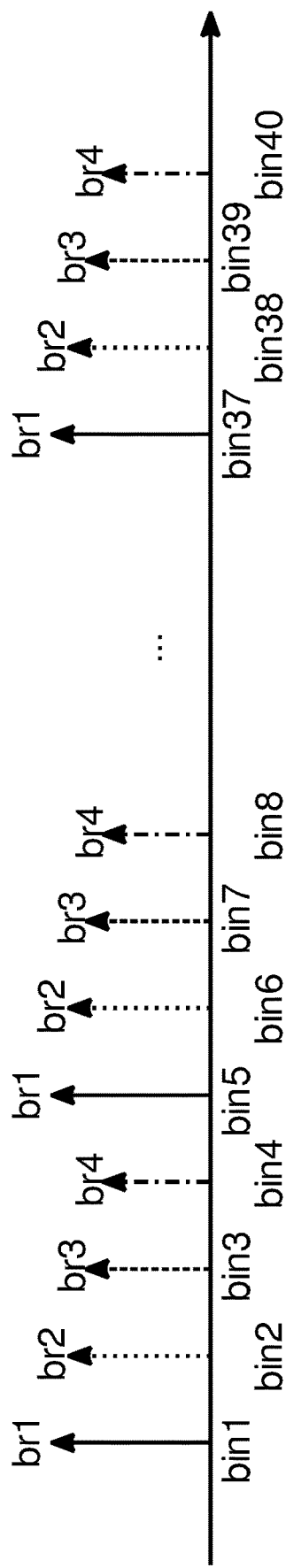
FIG. 9 illustrates a plurality of frequency bins for a plurality of branches.

The compensation parameter vector can be calculated by $$v_p=(A_p^H A_p)^{-1} A_p^H c_p$$

all $v_p$ for p=1, 2, . . . , N, $$v_p=[\widetilde{D_p},\widetilde{\theta_p}]^T$$

can be directly applied to the compensation module 102 on antenna branch p. The first element $\widetilde{D_p}$ should be used to design both the fractional delay finite impulse response (FIR) filter coefficients and integer delay line parameter. The second element $\widetilde{\theta_p}$ should be directly used to correct phase rotation in the phase compensator sub-block 102-C as shown in FIG. 9. After all antenna branches are compensated, they should have the same delay $D_{tar}$ and the phase rotation should be compensated to zero.

Thus, some embodiments provide an indirect learning structure to obtain compensation parameters directly. Frequency domain LS based linear regression applied to the phase response provides joint estimate of the delay and phase. Some embodiments also include interleaving of frequency bins for multiple antenna branches to have all antenna branches separated in the frequency domain to offer better estimation precision.

According to one aspect, a method of compensating for phase and delay introduced by each of a plurality of transmitter circuits is provided. The method includes generating N signals $x_p$ from N frequency domain signals $X_p$, each frequency domain signal $X_p$ being an $N_f$ point Fourier transform of a corresponding signal $x_p$, each frequency domain signal $X_p$ having components being assigned to $M_p$ different frequency bins, $M_p$ being an integer greater than 2, each signal $x_p$ having an orthogonal frequency division multiplex, OFDM, symbol and cyclic prefix, CP. The method further includes injecting each signal $x_p$ into a different one of N parallel feed forward paths, each parallel feed forward path having a phase/delay compensation circuit 102 and a transmitter circuit 104, each phase/delay compensation circuit 102 configured to introduce a different amount of first phase $\widetilde{\theta_p}$ and first delay $\widetilde{D_p}$ to a respective signal $x_p$ to produce a signal $z_p$, each transmitter circuit 104 introducing a different amount of unknown phase $\theta_p$ and unknown delay $D_p$ to a respective signal $z_p$, so that each transmitter circuit 104 outputs a different output signal $y_p$. The method further includes applying an $N_f$ point Fourier transform to a sum of the output signals $y_p$. The method also includes splitting the Fourier transformed sum to produce N signals $Y_p$. The method further includes inputting each signal $Y_p$ to a different one of N parallel feedback paths, each parallel feedback path having a phase/delay compensation replica circuit 114 corresponding to a phase/delay compensation circuit 102 and configured to introduce a corresponding first phase $\widetilde{\theta_p}$ and first delay $\widetilde{D_p}$ to a respective signal $Y_p$ to produce a signal $Y_p'$. The method also includes applying an $N_f$ point Fourier transform to each signal $z_p$ to produce a signal Z, and inputting each of the N signals $Y_p'$ and a corresponding one of the N signals Z, to a least squared process 118 to produce N corrective signals $v_p$. The method also includes adjusting each phase/delay compensation circuit 102 by a respective one of the N corrective signals $v_p$ to compensate for the unknown phase $\theta_p$ and unknown delay $D_p$ introduced by each transmitter circuit 104 of the plurality of parallel transmitter circuits 104 in the plurality of feed forward parallel paths.

According to this aspect, in some embodiments, at least one of the phase/delay compensation circuits 102 includes a configurable multi-tap delay line 102-A, a configurable N-tap filter 102-B and a phase compensator 102-C. In some embodiments, the number $N_f$ is selected based on at least one of a signal sample rate, a signal bandwidth or the number N of feed forward paths. In some embodiments, a length of the CP is selected based on at least one of an anticipated delay of a transmitter circuit 104 in the plurality of transmitter circuits 104 or a difference in delay between the feed forward paths. In some embodiments, a maximum length of the CP is $N_f-1$. In some embodiments, the number M of frequency bins is proportional to the number N of feed forward paths. In some embodiments, the number M of frequency bins is equal to the number N of feed forward paths times the number $N_f$ of points of X.

According to another aspect, a phase and delay compensation system 100 configured to compensate for phase and delay introduced by each of a plurality of transmitter circuits in a network node 16 is provided. The system 100 includes processing circuitry configured to generate N signals $x_p$ from N frequency domain signals $X_p$, each frequency domain signal $X_p$ being an $N_f$ point Fourier transform of a corresponding signal $x_p$, each frequency domain signal $X_p$ having components being assigned to $M_p$ different frequency bins, $M_p$ being an integer greater than 2, each signal $x_p$ having an orthogonal frequency division multiplex, OFDM, symbol and cyclic prefix, CP. The processing circuitry is also configured to inject each signal $x_p$ into a different one of N parallel feed forward paths, each parallel feed forward path having a phase/delay compensation circuit 102 and a transmitter circuit 104, each phase/delay compensation circuit 102 configured to introduce a different amount of first phase $\widetilde{\theta_p}$ and first delay $\widetilde{D_p}$ to a respective signal $x_p$ to produce a signal $z_p$, each transmitter circuit 104 introducing a different amount of unknown phase $\theta_p$ and unknown delay $D_p$ to a respective signal $z_p$, so that each transmitter circuit 104 outputs a different output signal $y_p$. The processing circuitry is further configured to apply an $N_f$ point Fourier transform to a sum of the output signals $y_p$, and split the Fourier transformed sum to produce N signals $Y_p$. The processing circuitry is also configured to input each signal $Y_p$ to a different one of N parallel feedback paths, each parallel feedback path having a phase/delay compensation replica circuit 114 corresponding to a phase/delay compensation circuit 102 and configured to introduce a corresponding first phase $\widetilde{\theta_p}$ and first delay $\widetilde{D_p}$ to a respective signal $Y_p$ to produce a signal $Y_p'$. The processing circuitry is further configured to apply an $N_f$ point Fourier transform to each signal $z_p$ to produce a signal $Z_p$, and input each of the N signals $Y_p'$ and a corresponding one of the N signals 4 to a least squared process 118 to produce N corrective signals $v_p$. The processing circuitry is also configured to adjust each phase/delay compensation circuit 102 by a respective one of the N corrective signals $v_p$ to compensate for the unknown phase $\theta_p$ and unknown delay $D_p$ introduced by each transmitter circuit 104 of the plurality of parallel transmitter circuits 104 in the plurality of feed forward paths.

According to this aspect, in some embodiments, at least one of the phase/delay compensation circuits 102 includes a configurable multi-tap delay line 102-A, a configurable N-tap filter 101-B and a phase compensator 102-A. In some embodiments, the number $N_f$ is selected based on at least one of a signal sample rate, a signal bandwidth or the number N of feed forward paths. In some embodiments, a length of the CP is selected based on at least one of an anticipated delay of a transmitter circuit 104 of the plurality of transmitter circuits 104 or a difference in delay between the feed forward paths. In some embodiments, a maximum length of the CP is $N_f-1$. In some embodiments, the number M of frequency bins is proportional to the number N of feed forward paths. In some embodiments, the number M of frequency bins is equal to the number N of feed forward paths times the number $N_f$ of points of X.

According to yet another aspect, a phase and delay compensation system implemented in a network node 16 configured to compensate for phase and delay introduced by each of a plurality of parallel transmitter circuits is provided. The system includes processing circuitry 48 configured to inject N signals, x, into N circuit paths that each include a phase/delay compensation module 102 and a transmitter circuit 104, each signal x having an orthogonal frequency division multiplex, OFDM, symbol and cyclic prefix, CP, x being generated by an $N_f$ point inverse Fourier transform on a frequency domain signal, X, each frequency domain signal X having components being assigned to M different frequency bins, M being an integer greater than 2. The processing circuitry 48 is further configured to introduce to each of the N signals x a first phase and a first delay via a phase/delay compensation module 102 to produce from each of the N circuit paths an output signal z. The processing circuitry is also configured to input each of the N signals z to a different transmitter circuit 104, which introduces to the signal z an unknown phase and an unknown delay to produce one of N outputs y. The processing circuitry is further configured to sum by an adder 106 the N outputs y to form a sum signal and perform an $N_f$ point Fourier transform, via an FFT 110, on the output y to produce a Fourier transformed output signal. The processing circuitry is further configured to split the Fourier transformed output signal, via a splitter 112, into N parallel signals Y, each signal Y having components from different ones of the M frequency bins, and introduce to each of the N signals Y the first phase and first delay in a phase/delay compensation replica module 114 to produce N corresponding signals Y'. The processing circuitry is further configured to perform an $N_f$ point Fourier transform, via an FFT 116, on each signal z to produce a plurality of N parallel signals Z and input each of the N signals Y' and a corresponding one of the N signals Z to a least squared process 118 to produce N corrective signals v. The processing circuitry is further configured to adjust each phase/delay compensation module 102 by a respective one of the N corrective signals v to compensate for the unknown phase and unknown delay introduced by each transmitter circuit 104 in the plurality of parallel transmitter circuits 104.

According to this aspect, in some embodiments, at least one of the phase/delay compensation modules 102 includes a configurable multi-tap delay line 102-A, a configurable N-tap filter 102-B and a phase compensator 102-C. In some embodiments, the number $N_f$ is selected based on at least one of a signal sample rate, a signal bandwidth or the number N of circuit paths. In some embodiments, a length of the CP is selected based on at least one of an anticipated delay of a transmitter circuit or a difference in delay between the circuit paths. In some embodiments, a maximum length of the CP is $N_f$−1. In some embodiments, the number M of frequency bins is proportional to the number N of circuit paths.

According to another aspect, a method of compensating for phase and delay introduced by each of a plurality of transmitter circuits is provided. The method includes generating a plurality of test signals x, each test signal x having frequency components distributed over a plurality of frequency bins. The method further includes injecting each of the plurality of test signals x into a different one of a plurality of branches, each branch having a phase/delay compensation circuit 102 and a transmitter circuit 104, each phase/delay compensation circuit 102 having a first phase and first delay applied to a test signal x to produce a signal z and the transmitter circuit configured to receive the signal z and having an unknown phase and unknown delay applied to the signal z to produce an output signal y. The method further includes converting the output signals y from the plurality of branches to a frequency domain, via the FFT 110, to produce a first set of frequency domain signals Y, each frequency domain signal Y having frequency components distributed over the plurality of frequency bins. The method also includes converting, via the FFTs 116, the signals z to the frequency domain to produce a second set of frequency domain signals Z, each frequency domain signal Z corresponding to a frequency domain signal Y. The method further includes applying the first phase and first delay to each signal Y via a phase/delay compensation replica circuits 114 to produce a signal Y'. The method also includes comparing, via the LS circuits 118 each signal Y' to a corresponding signal Z to produce a corrective signal v, and applying the corrective signal v to a corresponding phase/delay compensation circuit 102 in a branch to compensate for the unknown phase and unknown delay of a corresponding transmitter circuit in the branch.

According to this aspect, in some embodiments, the comparing is by a least squares algorithm. In some embodiments, each test signal x has an orthogonal frequency division multiplex, OFDM, symbol and cyclic prefix, CP, x being generated by an $N_f$-point inverse Fourier transform on a frequency domain signal, X, each frequency domain signal X having components being assigned to M different frequency bins, M being an integer greater than 2.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| CP | Cyclic Prefix |
| FFT | Fast Fourier Transform |
| IFFT | Inverse Fast Fourier Transform |
| LS | Least Square |
| OFDM | Orthogonal Frequency Division Multiplexing |
| RF | Radio Frequency |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of compensating for phase and delay introduced by each of a plurality of transmitter circuits, the method comprising:
    generating N signals $x_p$ from N frequency domain signals $X_p$, N being an integer greater than 1, each frequency domain signal $X_p$ being an $N_f$ point Fourier transform of a corresponding signal $x_p$, each frequency domain signal $X_p$ having components being assigned to $M_p$ different frequency bins, $M_p$ being an integer greater than 2, each signal $x_p$ having an orthogonal frequency division multiplex (OFDM), symbol and cyclic prefix (CP);
    injecting each signal $x_p$ into a different one of N parallel feed forward paths, each parallel feed forward path having a phase/delay compensation circuit and a transmitter circuit, each phase/delay compensation circuit configured to introduce a different amount of first phase $\widetilde{\theta_p}$ and first delay $\widetilde{D_p}$ to a respective signal $x_p$ to produce a signal $z_p$, each transmitter circuit introducing a different amount of unknown phase $\theta_p$ and unknown delay $D_p$ to a respective signal $z_p$, so that each transmitter circuit outputs a different output signal $y_p$;
    applying an $N_f$ point Fourier transform to a sum of the output signals $y_p$;
    splitting the Fourier transformed sum to produce N signals $Y_p$;
    inputting each signal $Y_p$ to a different one of N parallel feedback paths, each parallel feedback path having a phase/delay compensation replica circuit corresponding to a phase/delay compensation circuit and configured to introduce a corresponding first phase $\widetilde{\theta_p}$ and first delay $\widetilde{D_p}$ to a respective signal $Y_p$ to produce a signal $Y_p'$;
    applying an $N_f$ point Fourier transform to each signal $z_p$ to produce a signal $Z_p$;
    inputting each of the N signals $Y_p'$ and a corresponding one of the N signals $Z_p$ to a least squared process to produce N corrective signals $v_p$; and
    adjusting each phase/delay compensation circuit by a respective one of the N corrective signals $v_p$ to compensate for the unknown phase $\theta_p$ and unknown delay $D_p$ introduced by each transmitter circuit of the plurality of parallel transmitter circuits in the plurality of feed forward parallel paths.

2. The method of claim 1, wherein at least one of the phase/delay compensation circuits includes a configurable multi-tap delay line, a configurable N-tap filter and a phase compensator.

3. The method of claim 1, wherein the number $N_f$ of Fourier transform points is selected based on at least one of a signal sample rate, a signal bandwidth and the number N of parallel feed forward paths.

4. The method of claim 1, wherein a length of the CP is selected based on at least one of an anticipated delay of a transmitter circuit in the plurality of transmitter circuits and a difference in delay between the parallel feed forward paths.

5. The method of claim 1, wherein a maximum length of the CP is $N_f-1$.

6. The method of claim 1, wherein the number $M_p$ of frequency bins is proportional to the number N of parallel feed forward paths.

7. The method of claim 1, wherein the number $M_p$ of frequency bins is equal to the number N of parallel feed forward paths times a number $N_f$ of points of $X_p$.

8. A phase and delay compensation system configured to compensate for phase and delay introduced by each of a plurality of transmitter circuits in one of a network node and a wireless device, the system comprising processing circuitry configured to:
    generate N signals $x_p$ from N frequency domain signals $X_p$, N being an integer greater than 1, each frequency domain signal $X_p$ being an $N_f$ point Fourier transform of a corresponding signal $x_p$, each frequency domain signal $X_p$ having components being assigned to $M_p$ different frequency bins, $M_p$ being an integer greater than 2, each signal $x_p$ having an orthogonal frequency division multiplex (OFDM), symbol and cyclic prefix (CP);
    inject each signal $x_p$ into a different one of N parallel feed forward paths, each parallel feed forward path having a phase/delay compensation circuit and a transmitter circuit, each phase/delay compensation circuit configured to introduce a different amount of first phase $\widetilde{\theta_p}$ and first delay $\widetilde{D_p}$ to a respective signal $x_p$ to produce a signal $z_p$, each transmitter circuit (104) introducing a different amount of unknown phase $\theta_p$ and unknown delay $D_p$ to a respective signal $z_p$, so that each transmitter circuit outputs a different output signal $y_p$;
    apply an $N_f$ point Fourier transform to a sum of the output signals $y_p$;
    split the Fourier transformed sum to produce N signals $Y_p$;
    input each signal $Y_p$ to a different one of N parallel feedback paths, each parallel feedback path having a phase/delay compensation replica circuit corresponding to a phase/delay compensation circuit and configured to introduce a corresponding first phase $\widetilde{\theta_p}$ and first delay $\widetilde{D_p}$ to a respective signal $Y_p$ to produce a signal $Y_p'$;
apply an $N_f$ point Fourier transform to each signal $z_p$ to produce a signal $Z_p$;
input each of the N signals $Y_p'$ and a corresponding one of the N signals $Z_p$ to a least squared process to produce N corrective signals $v_p$; and
adjust each phase/delay compensation circuit by a respective one of the N corrective signals $v_p$ to compensate for the unknown phase $\theta_p$ and unknown delay $D_p$ introduced by each transmitter circuit of the plurality of parallel transmitter circuits in the plurality of feed forward paths.

9. The system of claim 8, wherein at least one of the phase/delay compensation circuits include a configurable multi-tap delay line, a configurable N-tap filter and a phase compensator.

10. The system of claim 8, wherein the number $N_f$ of Fourier transform points is selected based on at least one of a signal sample rate, a signal bandwidth and the number N of parallel feed forward paths.

11. The system of claim 8, wherein a length of the CP is selected based on at least one of an anticipated delay of a transmitter circuit in the plurality of transmitter circuits and a difference in delay between the parallel feed forward paths.

12. The system of claim 8, wherein a maximum length of the CP is $N_f-1$.

13. The system of claim 8, wherein the number $M_p$ of frequency bins is proportional to the number N of parallel feed forward paths.

14. The system of claim 8, wherein the number $M_p$ of frequency bins is equal to the number N of parallel feed forward paths times the number $N_f$ of Fourier transform points.

15. A phase and delay compensation system implemented in a network node configured to compensate for phase and delay introduced by each of a plurality of parallel transmitter circuits, the system comprising processing circuitry configured to:
inject N signals, x, into N circuit paths that each include a phase/delay compensation module and a transmitter circuit, N being an integer greater than 1, each signal x having an orthogonal frequency division multiplex (OFDM), symbol and cyclic prefix (CP), x being generated by an $N_f$ point inverse Fourier transform on a frequency domain signal X, each frequency domain signal X having components being assigned to M different frequency bins, M being an integer greater than 2;
introduce to each of the N signals x a first phase and a first delay via a phase/delay compensation module to produce from each of the N circuit paths an output signal z;
input each of the N signals z to a different transmitter circuit, which introduces to the signal z an unknown phase and an unknown delay to produce one of N outputs y;
sum by an adder the N outputs y to form a sum signal;
perform an $N_f$ point Fourier transform, via an FFT, on the sum signal to produce a Fourier transformed output signal;
split the Fourier transformed output signal, via a splitter, into N parallel signals Y, each signal Y having components from different ones of the M frequency bins;
introduce to each of the N signals Y the first phase and first delay in a phase/delay compensation replica module to produce N corresponding signals Y';
perform an $N_f$ point Fourier transform, via an FFT, on each signal z to produce a plurality of N parallel signals Z;
input each of the N signals Y' and a corresponding one of the N signals Z to a least squared process to produce N corrective signals v; and
adjust each phase/delay compensation module by a respective one of the N corrective signals v to compensate for the unknown phase and unknown delay introduced by each transmitter circuit in the plurality of parallel transmitter circuits.

16. The system of claim 15, wherein at least one of the phase/delay compensation modules includes a configurable multi-tap delay line, a configurable N-tap filter and a phase compensator.

17. The system of claim 15, wherein the number $N_f$ of Fourier transform points is selected based on at least one of a signal sample rate, a signal bandwidth and the number N of circuit paths.

18. The system of claim 15, wherein a length of the CP is selected based on at least one of an anticipated delay of a transmitter circuit in the plurality of transmitter circuits and a difference in delay between the circuit paths.

19. The system of claim 15, wherein a maximum length of the CP is $N_f-1$.

20. The system of claim 15, wherein the number M of frequency bins is proportional to the number N of circuit paths.

21. A method of compensating for phase and delay introduced by each of a plurality of transmitter circuits, the method comprising:
generating a plurality of test signals x, each test signal x having frequency components distributed over a plurality of frequency bins;
injecting each of the plurality of test signals x into a different one of a plurality of branches, each branch having a phase/delay compensation circuit and a transmitter circuit, each phase/delay compensation circuit having a first phase and first delay applied to a test signal x to produce a signal z and the transmitter circuit configured to receive the signal z and having an unknown phase and unknown delay applied to the signal z to produce an output signal y;
converting the output signals y from the plurality of branches to a frequency domain to produce a first set of frequency domain signals Y, each frequency domain signal Y having frequency components distributed over the plurality of frequency bins;
converting the signals z to the frequency domain to produce a second set of frequency domain signals Z, each frequency domain signal Z corresponding to a frequency domain signal Y;
applying the first phase and first delay to each signal Y via a phase/delay compensation replica circuit to produce a signal Y';
comparing each signal Y' to a corresponding signal Z to produce a corrective signal v; and
applying the corrective signal v to a corresponding phase/delay compensation circuit in a branch to compensate for the unknown phase and unknown delay of a corresponding transmitter circuit in the branch.

22. The method of claim 21, wherein the comparing is by a least squares algorithm.

23. The method of claim 21, wherein each test signal x has an orthogonal frequency division multiplex (OFDM), symbol and cyclic prefix (CP), x being generated by an $N_f$ point inverse Fourier transform on a frequency domain signal, X, each frequency domain signal X having components being assigned to M different frequency bins, M being an integer greater than 2.

* * * * *